United States Patent

Gai

Patent Number: 5,829,909
Date of Patent: Nov. 3, 1998

[54] MALE COUPLER END FOR A ROTARY STEERING CABLE

[75] Inventor: Giorgio Gai, Genoa, Italy

[73] Assignee: Ultraflex S.r.l., Genoa, Italy

[21] Appl. No.: 844,599

[22] Filed: Apr. 21, 1997

Related U.S. Application Data

[60] Provisional application No. 60/025,737, Sep. 10, 1996.

[51] Int. Cl.[6] ........................................ F16B 17/00
[52] U.S. Cl. ......................... 403/261; 403/225; 403/375; 74/502.6
[58] Field of Search .................... 403/261, 225, 403/375, 226, 254; 74/502.6; 285/318

[56] References Cited

U.S. PATENT DOCUMENTS

| | | | |
|---|---|---|---|
| 3,372,560 | 3/1968 | Dalton | 74/502.6 |
| 3,521,502 | 7/1970 | Houk . | |
| 3,702,708 | 11/1972 | Moore . | |
| 4,579,476 | 4/1986 | Post . | |
| 4,645,245 | 2/1987 | Cunningham . | |
| 4,645,368 | 2/1987 | Simpson et al. . | |
| 4,688,445 | 8/1987 | Spease et al. . | |
| 4,738,155 | 4/1988 | Stocker | 74/502.6 |
| 4,804,290 | 2/1989 | Balsells | 403/225 |
| 4,867,487 | 9/1989 | Phillis . | |
| 5,039,138 | 8/1991 | Dickirson | 74/502.6 |
| 5,104,156 | 4/1992 | Carlson . | |
| 5,253,543 | 10/1993 | Carlson . | |

Primary Examiner—Anthony Knight
Assistant Examiner—John R. Cottingham

[57] ABSTRACT

A male coupler end fitting assembly in combination with a flexible conduit is disclosed. The male coupler includes a substantially cylindrical body portion having a male adaptor end and a conduit attachment end disposed on opposing ends of the cylindrical body portion. The male adaptor end has a chamfered surface terminating in a protruding disc shaped end face of a constant uniform diameter, and a transition bevel of a constant uniform diameter circumscribing the male coupler. A relief surface is formed which circumscribes the male coupler, the relief surface being disposed adjacent the transition bevel and perpendicular to ta longitudinal axis. An end face wall circumscribes the male coupler and is disposed adjacent the conduit attachment end and perpendicular to the longitudinal axis. The end face wall has a defined width extending from an outer circumference of the conduit attachment end to a smaller inner circumference, the outer circumference of the conduit attachment end substantially corresponding to the outer circumference of the transition bevel, so as to define a groove between the relief surface and the end face wall. The groove is of a constant diameter and meets with each of the relief surface and the end face wall at substantially a 90 degree angle.

13 Claims, 3 Drawing Sheets

MALE COUPLER END FOR A ROTARY STEERING CABLE

This application claims benefit of USC Provisional application Ser. No. 60/025,737, filed Sep. 10, 1996.

BACKGROUND OF THE INVENTION

1. Field of the Invention

The present invention relates to a male coupler end for a rotary steering cable for use in a variety of helms known in the art.

2. Description of Related Art

Known male coupler ends in combination with rotary steering cables include the type shown by way of example in FIGS. 1, 2 and 3. More specifically, a conventional rotary steering cable housing is shown at 10 in FIG. 1. The housing includes a base 12 joined to a rear cover 14 by a plurality of screws 26 and corresponding washers 28 (see also FIG. 3).

A planet wheel 16 and a cable holder wheel 18 are formed within the housing 10. A bushing cable holder wheel 20 is provided in connection with the cable holder wheel 18 and a guide 24 for the cable is at an outer periphery of the cable holder wheel 18. The housing 10 is formed about a shaft 22. In turn, the shaft 22 is surrounded by a plurality of bushing flanges 30, and a pair of the bushing flanges 30 are spaced from the rotating planet wheel 16 by bushing flange washers 32. Additionally, a planet wheel bushing 34 is formed between the planet wheel 16 and the cable holder wheel 18.

As shown in FIGS. 1 and 2, a threaded turning nut 36 attaches a flexible tube 38 to the housing 10 of the rotary steering cable. A cable is threaded through the flexible tube to the interior of the housing 10. It is also now known to utilize locking-type nut members and various other clips or spring loaded locking members of a quick connect type in order to attach various cables to existing helms. The availability of replacement cables in the art, especially at competitive prices, has spawned the development of adaptors to connect these various cables to helms that they were not originally designed to fit.

Accordingly, while the conventional attachments were suitable for their intended purpose, primarily as replacements for compatible parts, the need for interchangeable cables necessitated the development of a universal male coupler portion for attachment to the housing.

SUMMARY OF THE INVENTION

It is therefore an object of the present invention to provide a male coupler end for a rotary steering cable which overcomes the problems of the art identified above.

More particularly, it is an object of the invention to provide a male coupler end for a rotary steering cable which is universally compatible with existing and future cables and helms and which is an improvement over known male coupler ends for rotary steering cables.

In achieving the objects of the present invention, there is provided a rotary steering cable having a male coupler portion attached to the steering cable.

The male coupler portion includes a male adaptor end and a conduit attachment end opposing the male adaptor end. The male adaptor end includes at least a constant diameter portion, a truncated cone portion declining from the constant diameter portion, and a protruding disc shaped end face such that the truncated cone portion coextensively terminates in the protruding disc shaped end face. The truncated cone portion has a decreasing diameter from the constant diameter portion to the protruding disc shaped end face, and the protruding disc shaped end face is of a constant diameter.

The conduit attachment end opposing the male adaptor end is of a diameter substantially corresponding to the diameter of the constant diameter portion on the male adaptor end. Further the conduit attachment end includes a facing end formed perpendicular to the outer peripheral surface of the conduit attachment end. Likewise, the constant diameter portion of the male adaptor end terminates in a relief face formed perpendicular to the outer peripheral surface of the beveled portion. Thus, a groove of a constantly uniform diameter is formed between the opposing end face and relief surface and the transition between the groove and each of the end face and relief surface is at a radius of approximately 90 degrees.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
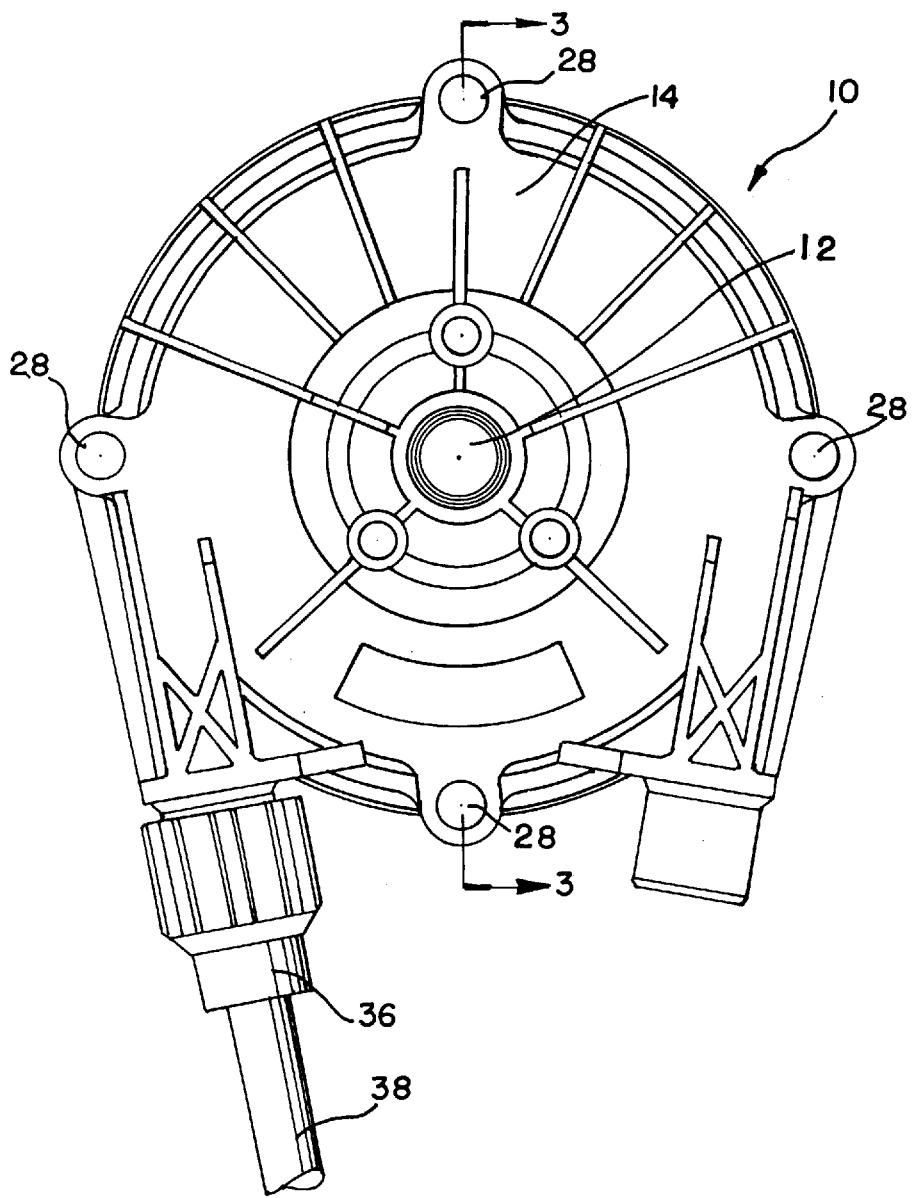
FIG. 1 is a front view of a conventional rotary helm and cable.
Figure 2:
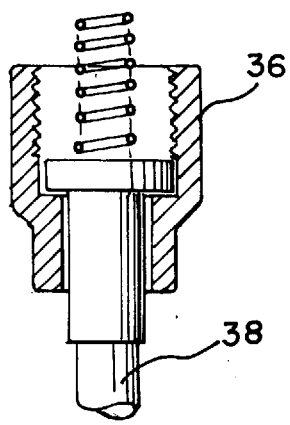
FIG. 2 is a cross sectional view of a known threaded female coupling portion shown in FIG. 1.
Figure 3:
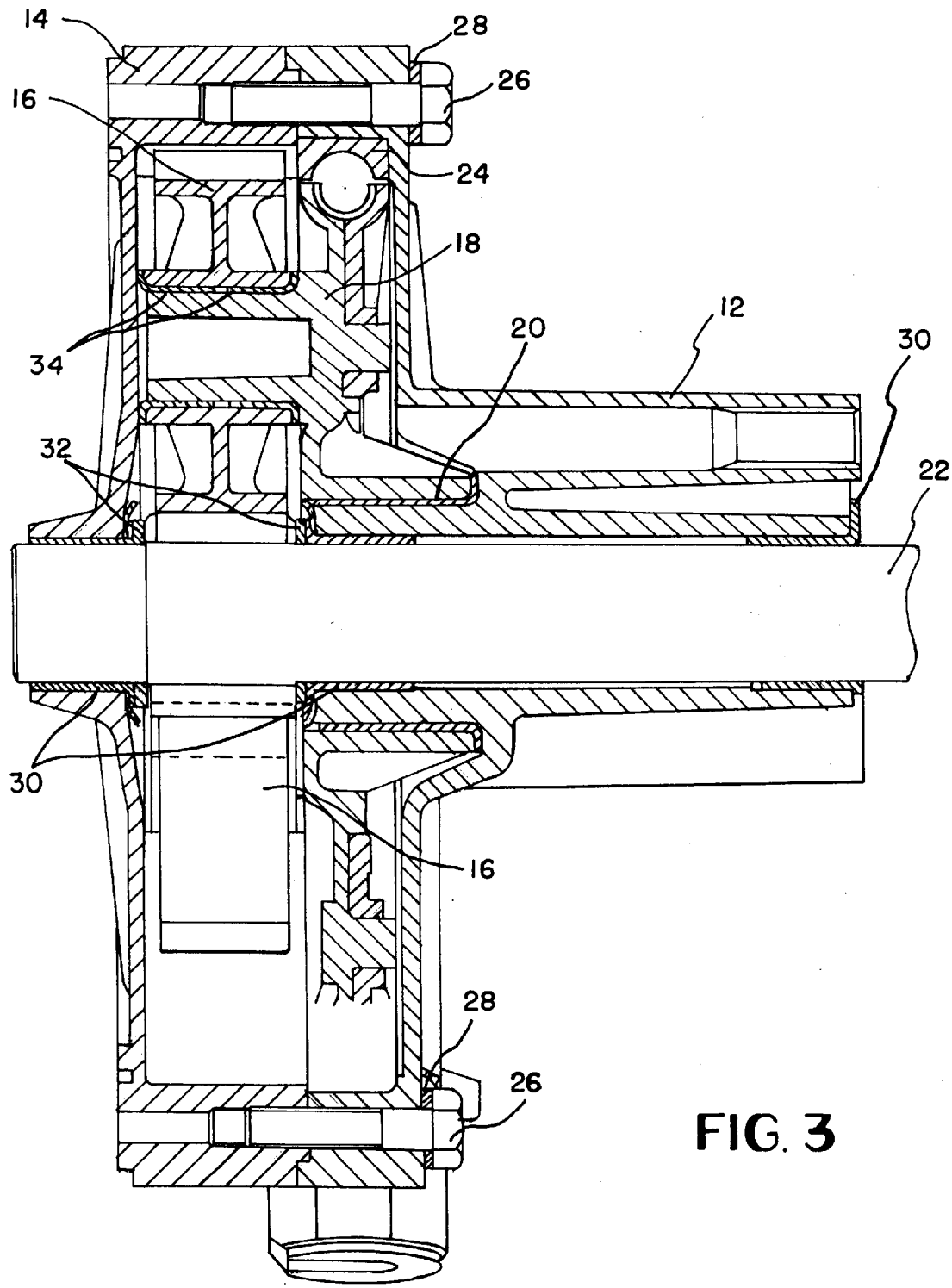
FIG. 3 is a sectional view taken along line 3—3 of FIG. 1.
Figure 5:
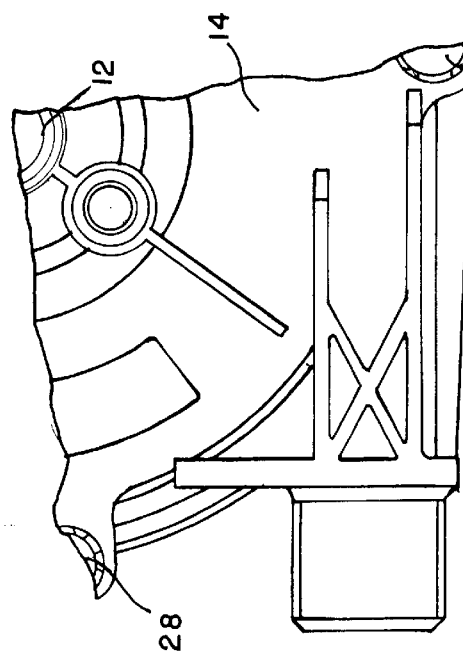
FIG. 5 is a partial side view of a helm housing for receiving the inventive coupler combination.
Figure 7:
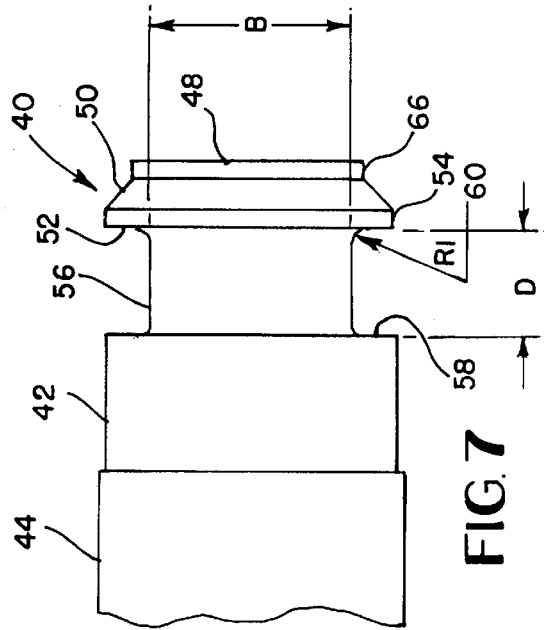
FIG. 7 is an exploded side view of the circled portion 40 shown in FIG. 6.
Figure 4:
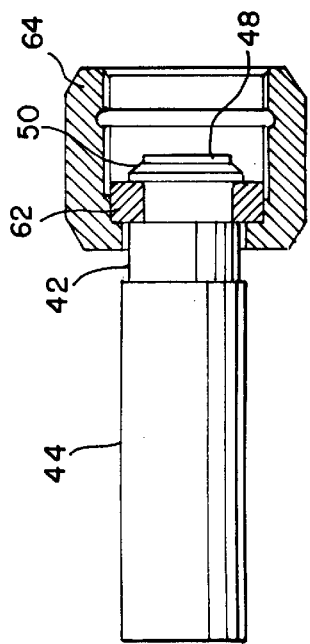
FIG. 4 is a side sectional view of the inventive male and female couplers for a cable and helm.
Figure 6:
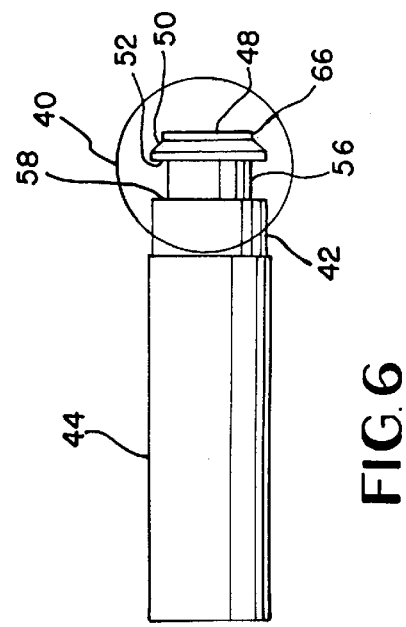
FIG. 6 is a side view of the male portion of the coupler.

Referring particularly to FIGS. 4, 6, and 7, a male coupler portion 40 of the combined male and female couplers is formed of a substantially cylindrical body portion and includes a conduit attachment end 42 and a male adaptor end 48, respectively, at opposing ends of the male coupler portion 40.

A flexible conduit 44 is connectable to the male coupler portion 40 at the conduit attachment end 42 thereof. As shown in FIG. 4, the flexible conduit 44 houses a cable member such as a helical cable (not shown), and the cable member is secured to the conduit attachment end 42 of the male coupler portion 40.

A series of predetermined reliefs and slopes are formed on the male coupler portion 40 between the male adaptor end 48 and the conduit attachment end 42. In particular, a constant diameter surface 54 is formed to be of a substantially similar diameter as the conduit attachment end 42 of the male coupler portion 40. A groove 56 is formed of a smaller constant diameter between the outer peripheral surfaces of the constant surface diameter surface 54 and the conduit attachment end 42. A transition between the conduit attachment end 42 and the groove 56 is defined by a face end 58 formed substantially perpendicular to the outer peripheral surface of the conduit attachment end 42. A transition between the constant diameter surface 54 and the groove 56 is defined by a relief surface 52 formed substantially perpendicular to the outer peripheral surface of the constant diameter surface 54. The groove 56 has a substantially constant and uniform diameter thereacross except for a small radius of transition 60 from the groove 56 to each of the relief surface 52 and the facing end 58. In this instance, the radius of transition 60 between the groove 56 and each of the relief surface 52 and the facing end 58 is approximately 90 degrees. The facing end 58 corresponds in size and shape to the relief surface 52, such that these two surfaces oppose each other with the groove 56 therebetween.

Immediately adjacent the constant diameter surface 54 and on a side thereof opposing the relief surface 52, there is formed a chamfered surface 50 of decreasing diameter away from the beveled surface 54. The chamfered surface 50 terminates in a protruding disc shaped end face 66 of a constant uniform diameter. Thus, the constant diameter surface 54 forms a transition between the chamfered surface 50 and the relief surface 52 of the male coupler 40. The protruding disc shaped end face 66 is a particularly useful end to include in the male coupler 40 at the male adaptor end 48 thereof, as it is (in combination with the chamfered surface 50 and the constant diameter surface 54) able to coact securely and with a tight surface fit with a variety of different female mating surfaces.

The groove 56 is formed so as to receive a means for coacting or joining together, labeled as element 62 and shown in FIG. 4. The exact nature and structure of the means for coacting 62 comprises, for example, an open washer which is laterally inserted into the groove 56. The open washer or means for coacting 62 will extend a predetermined distance above the outer peripheral surface of the beveled surface 54 of the substantially cylindrical body of the male coupler portion 40. A primary characteristic of the means for coacting 62 is that it securely fits against the relief surface 52 of the male coupler 40 so as to be in surface contact with an entirety of the relief surface 52 and thus prevent movement of the male coupler 40 within a female housing. This secure connection aids in preventing an unforseen separation of the male coupler 40 from the helm or housing to which it is attached.

A female housing or nut member 64 surrounds the means for coacting 62 by peripherally contacting or abutting the outer peripheral surface of the substantially cylindrical body portion of the male coupler 40 at least at the cable attachment end 42 thereof.

By the assembly shown and described, the male coupler 40 is easily adapted for use with either a threaded helm cable or a quick connect type helm cable, so as to be universally applicable in the industry.

The male coupler 40 is specially designed to allow enough flat surface area at the relief portion 52 to adequately accept a flat surfaced ring such as that shown at 62. The shown design is also adaptable for use with an inserted retaining bolt as the means for coacting 62, likewise reducing the opportunity for movement of the male end coupler within a female receptacle such as a nut member. Still further, the insertion or male adaptor end 48 of the male coupler portion 40 is specially designed as explained above in order to mate with any variety of known female couplers including but not limited to a screw-thread type and a snap-fit type female coupler. Such a universally adaptable male coupler has not previously been known in the art.

The invention being thus described, it will be obvious that the same may be varied in many ways. Such variations are not to be regarded as a departure from the spirit and scope of the invention, and all such modifications as would be apparent to one skilled in the art are intended to be included within the scope of the following claims.

I claim:

1. A male end coupler comprising:

a male adaptor end and a cable attachment end;

an end face wall formed transverse to an outer peripheral surface of said cable attachment end;

a transition surface circumscribing an outer periphery of said male adaptor end;

a relief surface formed transverse to an outer peripheral surface of said transition surface;

a groove formed substantially intermediate said male adaptor end and said cable attachment end, said groove being defined by said relief surface and said end face wall;

a chamfered face projecting as a truncated cone from said transition surface; and a protruding disc shaped end portion having a constant diameter circumference and terminating in a flat end face surface immediately adjacent said constant diameter circumference, said protruding disc shape formed at a distal end of said chamfered face.

2. The male end coupler according to claim 1, wherein said groove, transition surface, chamfered face and protruding disc shaped end face are integrally formed.

3. The male end coupler according to claim 2, wherein said integrally formed parts are of a one-piece construction.

4. The male end coupler according to claim 1, wherein said chamfered face is formed as a flat angle with a continually decreasing diameter from said transition surface to said protruding disc shaped end face.

5. The male end coupler according to claim 1, wherein said groove is of a substantially constant diameter terminating at opposing ends thereof in a 90 degree angle into each of said relief surface and said end face wall.

6. The male end coupler according to claim 1, wherein said male end coupler has a substantially cylindrical body portion with a longitudinal axis formed therethrough.

7. The male end coupler according to claim 1, wherein said relief surface is formed perpendicular to an outer peripheral surface of said transition surface.

8. The male end coupler according to claim 1, wherein said relief surface is formed perpendicular to an outer peripheral surface of said transition surface.

9. A male coupler end fitting assembly in combination with a flexible conduit, comprising:

a male coupler fixedly attached to said flexible conduit;

said male coupler including a substantially cylindrical body portion having a male adaptor end and a conduit attachment end disposed on opposing ends of said cylindrical body portion;

said male adaptor end having a leading chamfered surface terminating in a protruding disc shaped end face of a constant uniform diameter and having a flat terminal face immediately adjacent the constant uniform diameter surface, and a transition surface of a constant uniform diameter circumscribing said male coupler, said chamfered surface defining a slope between said transition surface and said protruding disc shaped end face;

a relief surface circumscribing said male coupler, said relief surface disposed immediately adjacent said transition surface and perpendicular to said longitudinal axis, said relief surface including a defined width extending from an outer circumference defined by said transition surface to an inner circumference smaller than said outer circumference; and an end face wall circumscribing said male coupler, said end face wall disposed adjacent said conduit attachment end and perpendicular to said longitudinal axis, said end face wall including a defined width extending from an outer circumference defined by said cable attachment end to an inner circumference smaller than said outer circumference, so as to define a groove between said end face wall and said relief surface;

said groove being of a constant diameter and meeting with each of said relief surface and said end face wall at substantially a 90 degree angle.

10. The male end coupler according to claim 9, wherein a diameter of said transition surface is greater than a diameter of said protruding disc shaped end face.

11. The male end coupler according to claim 9, wherein said transition surface, said chamfered surface and said protruding disc shaped end face are integrally formed.

12. The male end coupler according to claim 11, wherein said integral formation is of a one-piece construction.

13. The male end coupler according to claim 9, wherein said chamfered face is formed as a flat angle with a continually decreasing diameter from said transition surface to said protruding disc shaped end face.

\* \* \* \* \*